United States Patent [19]
Klett et al.

[11] Patent Number: 5,759,241
[45] Date of Patent: Jun. 2, 1998

[54] DESICCANT CANISTER

[75] Inventors: George E. Klett, Albuquerque; John E. Thomas, Los Lunas, both of N. Mex.

[73] Assignee: United Catalysts, Inc.—Desiccants, Belen, N. Mex.

[21] Appl. No.: 696,471

[22] Filed: Aug. 14, 1996

Related U.S. Application Data

[63] Continuation of Ser. No. 367,576, Jan. 3, 1995, abandoned.

[51] Int. Cl.[6] ............................. B01D 53/02; B65D 51/16
[52] U.S. Cl. ........................ 96/134; 55/514; 220/371; 220/373; 215/228
[58] Field of Search .................... 220/367.1, 369, 220/370, 371, 372, 373, 780, 521, 501, 503, 505; 215/228, 261, 347, 348, 349; 96/108, 134, 137; 206/7, 204; 55/514

[56] References Cited

U.S. PATENT DOCUMENTS

| | | |
|---|---|---|
| 2,852,326 | 9/1958 | Westlake, Jr. . |
| 2,994,404 | 8/1961 | Schifferly .................... 206/204 X |
| 3,820,309 | 6/1974 | Cullen et al. . |
| 4,093,105 | 6/1978 | Russell et al. . |
| 4,136,796 | 1/1979 | Dubois et al. .................. 220/371 X |
| 4,545,492 | 10/1985 | Firestone .................. 215/228 X |
| 4,772,300 | 9/1988 | Cullen et al. . |
| 4,783,206 | 11/1988 | Cullen et al. . |
| 5,191,721 | 3/1993 | Incorvia et al. . |

FOREIGN PATENT DOCUMENTS

| | | |
|---|---|---|
| 1238709 | 2/1958 | France . |
| 1295468 | 5/1969 | Germany .................. 215/261 |
| 2116742 | 4/1971 | Germany . |

*Primary Examiner*—Allan N. Shoap
*Assistant Examiner*—Nathan Newhouse

[57] ABSTRACT

A desiccant canister comprised of a generally cylindrical body portion, first and second end portions, and at least one gas permeable disk-shaped member, wherein the body portion is generally impermeable to liquids and gases, wherein at least one of the said end portions is perforated, and wherein the disk-shaped member is secured to the end portion of the canister containing perforations.

12 Claims, 3 Drawing Sheets

5,759,241

DESICCANT CANISTER

This is a continuation of application Ser. No. 08/367,576 filed on Jan. 3, 1995 now abandoned.

BACKGROUND OF INVENTION

1. Field of Invention

This invention relates to a desiccant canister. More specifically, this invention relates to a desiccant canister which permits gases and vapors to enter the canister to be absorbed by desiccant material contained therein without permitting the desiccant material to be released from the desiccant canister.

2. Prior Art

A number of small desiccant canisters formed from gas and liquid impermeable body portions with perforated end caps at one or both ends have been disclosed. See for example U.S. Pat. Nos. 2,852,326, 4,093,105 and 5,191,721. These canisters contain a desiccant material which absorbs moisture from the air as the air flows through perforations in the ends of the desiccant canister. However, some desiccant materials, such as activated charcoal, form a fine powder, which powder may pass through these perforations in the canisters. When desiccant canisters of this type are used within containers for medicinal tablets or capsules, this fine powder can be deposited on the tablets or capsules. While this dust is generally harmless, as conventional desiccant materials are generally non-toxic, the dusting action is an undesirable feature of these canisters.

U.S. Pat. No. 4,772,300 discloses an absorbent cartridge which attempts to address this problem. This cartridge is similar in design to conventional desiccant canisters except elongated ribs are provided on the outside surface of the canister. In addition, at least one of the ends of the canister is prepared from a permeable, spun bonded polyolefin which is gas permeable to permit water vapor to pass therethrough. Difficulties in manufacture and use still exist with this type of canister. For example, it has been discovered that the use of such a polyolefinic material to form the end of an adsorbent cartridge may be impractical as the polyolefin material cannot be easily or economically secured to the body of the desiccant canister to form an end of the canister. In addition, seals formed about this material are frequently weak, thus allowing either the complete discharge of the desiccant material from the canister or a gradual loss of the desiccant material around the edges of the canister.

Other adsorbent cartridges for use in medicine pill containers are disclosed, for example, in U.S. Pat. Nos. 3,820,309, 2,852,326 and 2,838,795. See also U.S. Pat. No. 4,093,105 which discloses a desiccant cartridge for use with drugs and chemicals. Adsorbent packages formed from a spun bonded polyolefin are disclosed, for example, in U.S. Pat. No. 3,990,872. See also U.S. Pat. No. 3,309,849.

While there have been several attempts to address the problem of providing a desiccant canister for use with pharmaceutical products which will absorb both water vapor and at the same time not create the "dusting" problem that has been prevalent with prior desiccant canisters, no completely workable canister has been developed.

Therefore, it is an object of this invention to provide a desiccant canister for use with pharmaceutical products.

It is another object of this invention to provide a desiccant canister which will efficiently and effectively absorb water vapor.

It is another object of this invention to provide a desiccant canister which will efficiently absorb water vapor while at the same time not permit the desiccant material contained within the canister from spilling out of the canister in normal use.

It is a still further object of this invention to provide a desiccant canister which will efficiently absorb water vapor while at the same time eliminate the "dusting" problem present in certain prior canisters.

These and other objects and features of the present invention will become apparent to those skilled in the art from a consideration of the following detailed description, drawings and claims. The description, along with the accompanying drawings, provides a selected example of construction of the product to illustrate the invention.

(c) SUMMARY OF INVENTION

In accordance with the present invention, there is provided a desiccant canister comprised of a cylindrical body portion, first and second end portions, and at least one disk-shaped, gas permeable member, wherein the body portion is generally impermeable to liquids or gases, wherein at least one of the said end portions is perforated and wherein said disk-shaped, gas permeable member is secured to the end portion of said canister containing perforations.

There is further disclosed a process for the forming of the desiccant canister comprised of (a) forming a cylindrical body portion open at both ends;

(b) closing one open end of the body portion with a gas impermeable, first end portion;

(c) forming a second end portion from a gas impermeable material, wherein said second end portion contains perforations therethrough;

(d) forming a gas permeable, disk-shaped member;

(e) securing the gas permeable, disk-like member to the second end portion containing perforations;

(f) filling the body portion with a desiccant material; and (g) securing the second end portion to the body portion to form a desiccant canister.

(d) BRIEF DESCRIPTION OF THE DRAWINGS

This invention will now be described with reference to the accompanying drawings in which FIG. 1 is a cut-away side view of the desiccant canister showing the gas permeable disk-like member.

(e) DETAILED DESCRIPTION OF THE PREFERRED EMBODIMENT

Figure 1:
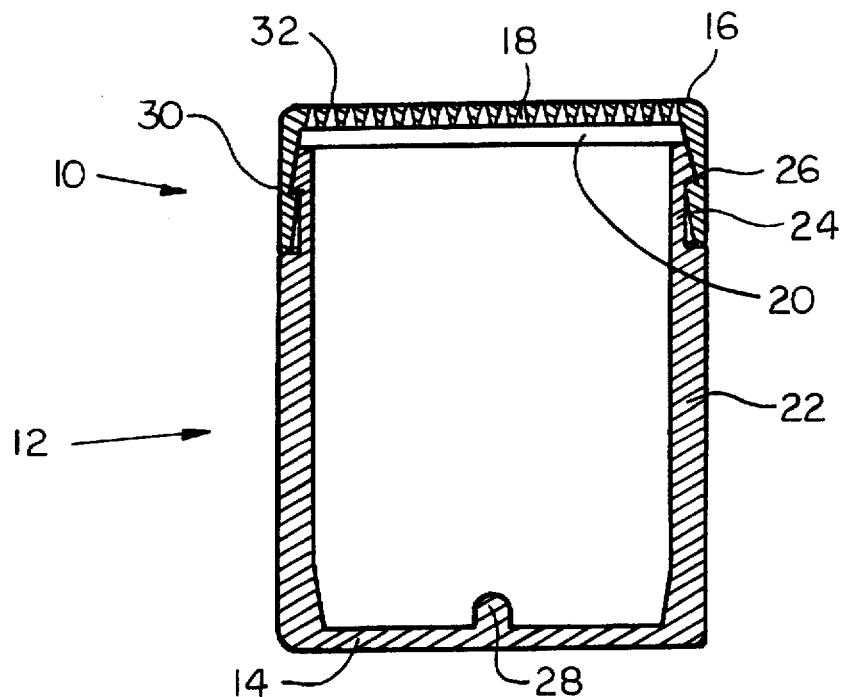

Although the invention is adaptable to a wide variety of uses, it is shown in the drawings for purpose of illustration as embodied in a desiccant canister (10) comprised of a body portion (12) open at each end, first (14) and second end (16)

portions, at least one of which contains perforations (18) and a gas permeable, disk-shaped member (20) for securing to the end of the desiccant canister containing perforations. See FIG. 1.

Figure 2:
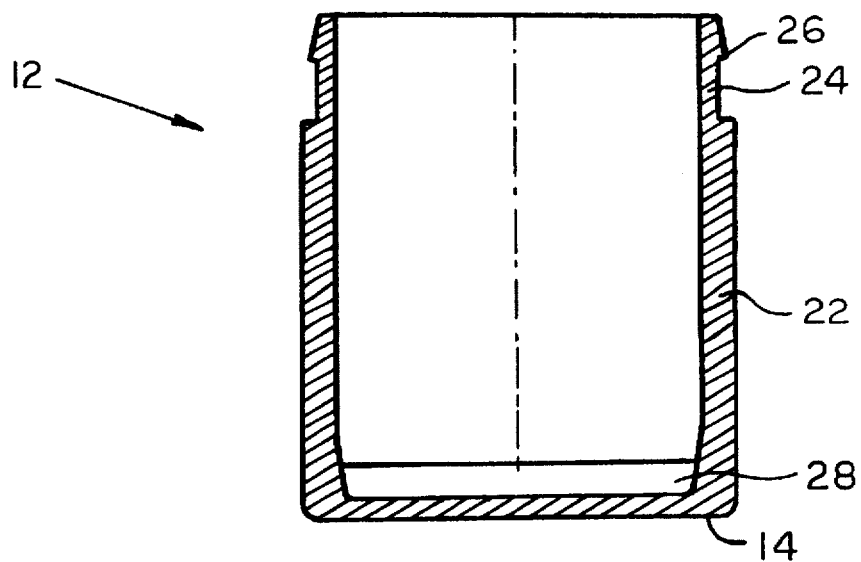
FIG. 2 is a side view of the desiccant canister with the first end portion secured in place but without the second end portion.

The canister body portion (12) is generally formed from gas impermeable, plastic materials well known in the industry. It is generally cylindrical in shape and open at each end. The outer wall (22) of the body portion (12) has a recessed ring portion (24) around its outer surface, near at least one of its ends. A rounded locking rib (26) projects radially outward from this recessed ring portion (24). This locking rib, which projects outward around the circumference of the outer wall (22), is used for locking one of the end portions in place to the body portion (12). See FIG. 2.

While the end portions of the desiccant canister can be formed separately from the canister, in a preferred embodiment the first end portion (14) is formed as an integral element of the body portion (12). See FIG. 2. The first end portion (14) is generally formed from gas impermeable plastic material well known in the industry, similar to the material used to form the body portion. This first end portion (14) preferably has a reinforcing rib or reinforcing ribs (28) extending radially across the inner surface of the first end portion to provide structural support for the first end portion.

Figure 3:
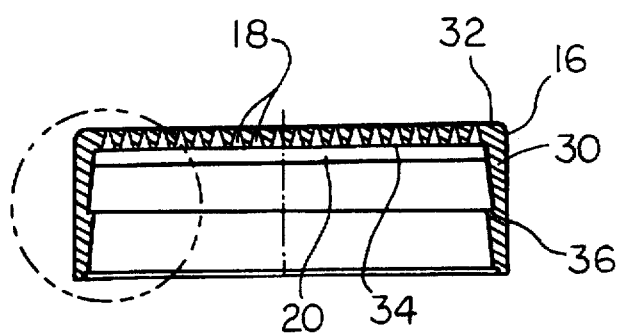
FIG. 3 is a cut-away side view of the end portion of the desiccant canister containing the gas permeable disk-like member.
Figure 4:
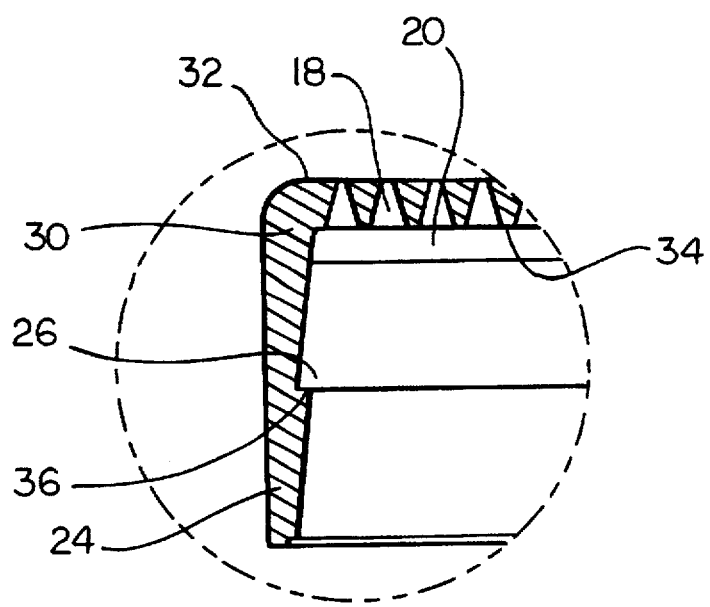
FIG. 4 is a cut-away section of FIG. 3 showing the side edge of the desiccant canister containing the gas permeable disk-like member.
Figure 5:
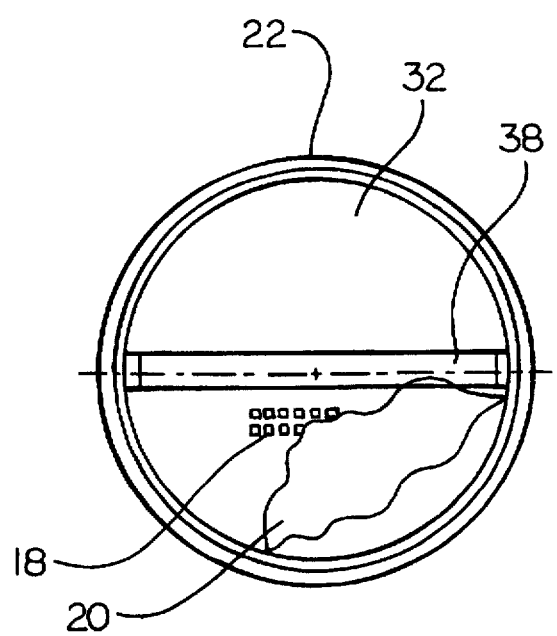
FIG. 5 is a cut-away end view of the second end portion showing both the perforations in the end portion and the disk-shaped member.

The second end portion (16) is formed in the shape of a cap and includes a cylindrical outer wall (30) and a flat top wall (32). See FIG. 3. The outer diameter of the cylindrical outer wall (30) preferably is equal to the outer diameter of the body portion (12). The inner diameter of the outer wall of the second end portion is equal to the diameter of the bottom surface (34) of the recessed ring portion (24) of the outer wall (22) of the body portion (12). The height of the outer wall is substantially equal to the depth of the recess of the recessed ring portion (24) from the top of the body portion. The outer wall of the second end portion has a rounded recess (36) around its inner surface. Thus, the outer wall (22) of the second end portion (16) can fit around the recessed ring portion (24) of the outer wall of the body portion (12) with the outer surface of the outer wall (22) of the second end portion (16) being flush with the inner surface of the outer wall, with the locking rib (26) snap fitting into the recess (36) in the outer wall (22) to lock the second end portion (16) onto the body portion (12). See FIGS. 1 and 4. The top wall (32) of the second end portion (16) also has, preferably, a reinforcing rib or reinforcing ribs (38) extending diametrically thereacross to provide structural security. A plurality of small perforations (18) extend through the top wall (32) in the area between the reinforcing ribs (38) and the outer wall (22). See FIGS. 4 and 5. These perforations are preferably in the shape of a truncated, square pyramids, having their small area ends at the outer surface of the second end portion and their larger area ends at the inner surface. The perforations can be as small as about 0.007 inches at their small end and about 0.018 inches at their larger end. There may be as many as 150 to 300 of these holes in the second end portion.

The canister itself can be made as small as about ½ inch in height and 17/32 inches in diameter, or even smaller, although different shapes are within the coverage of the specifications.

The shape of the canister creates an open area within the body portion to be filled with a desiccant material (not shown). In particular the desiccant material is introduced into the canister before the second end portion (16) is secured to the body portion (12). The types of desiccant material are well known in the industry and include, for example, activated charcoal, crystalline metal aluminosilicates, activated bentonites, silica gel, molecular sieves, calcium sulfate or any other suitable desiccant product or mixture thereof.

The disk-shaped member (20) to be used with the desiccant canister is shaped to fit within the inside of the second end portion (16) of the desiccant canister (10). See FIGS. 1, 3 and 4. It is dimensioned to fit tightly within the second end portion so that its edges fit with close tolerance within the cylindrical outer wall (30) of the second end portion of the canister. When this disk-shaped member is secured in place, it will cover substantially all of the perforations (18) in the second end portion.

This disk-shaped member (20) is formed from a material which is gas permeable. In the preferred embodiment, this material is a spun bonded polyolefin, and most preferably is formed of a TYVEK® material. While there are various grades of the TYVEK® material with different thicknesses, the exact thickness and material will depend on the specific application of the desiccant canister. In one preferred embodiment, the TYVEK® material for use is grade 1073B with a thickness of about 0.20–0.24 mm. As this disk-shaped member does not have any perforations and as it covers substantially all of the perforations of the second end portion (16), it will assist in retaining the desiccant material (40) within the desiccant canister (10). However, as the disk-shaped member is also gas permeable, water vapor can pass through the disk-shaped member (20) and be absorbed by the desiccant material (40). The disk-shaped member is secured within the second end portion by friction fitting, ultrasonic welding, adhesive sealing or any other method commonly used in the industry, preferably ultrasonic welding.

Once the disk-shaped member (20) is secured within the second end portion (16), the body portion is filled with the desiccant material. The second end portion is then placed over the top edge of the body portion (12) and snapped in place. The locking rib (26) of the body portion (12) interacts with the recess (36) in the outer wall (22) of the second end portion (16) to hold the second end portion securely in place. Once the second end portion (16) is in place on the body portion (12), a label can be secured around the cylindrical outer wall (30) of the canister with the label extending across the junction between the body portion (12) and the second end portion (16). Thus the label of the printing serves both to disclose the contents of the canister and, in addition, assist in preventing the second end portion (16) from being accidentally dislodged from the body portion.

The shape of the canister permits ease of molding of the body portion (12) and the second end portion (16) so that they can be formed completely of plastic to provide greater rigidity of the canister. The use of the gas permeable, but solid impermeable disk-shaped member (20) prevents the desiccant material of the canister from being discharged from the canister. However, gases and vapors can pass through the disk-shaped member to enter the canister to be absorbed by the desiccant material.

While the canister has been described with a single perforated second end portion (16) and a single disk-shaped member, a second perforated cap-like end and a second disk-shaped member can be secured to the opposite end of the body portion to enhance the absorption capability of the desiccant canister. If a second perforated end portion is used, the desiccant material should fill the canister after one of the end portions is secured in place against the body portion (12). Alternatively, this second end portion can be formed exclusively of a gas permeable material.

The process for the production of this desiccant canister begins with the forming of the cylindrically-shaped body portion (12) which is open at both ends. One end is closed by securing to that end, preferably, an impermeable first end portion (14). In a preferred embodiment the body portion and the impermeable first end portion are formed as one integral element. See FIG. 1. Following the forming of this body portion and first end portion (16), a second end portion is formed in a cap shape with a number of perforations (18) passing therethrough. A gas permeable, disk-shaped member (20) is next formed and secured within the inside of the second end portion (16) covering substantially all of the perforations of the second end portion. The body portion is then filled with the desiccant material. Following this filling, the second end portion (16) which contains the gas permeable disk-shaped member (20) is then secured to the body portion of the desiccant canister.

It will thus be seen that the objects set forth above, among those made apparent from the preceding description, are efficiently attained and, since certain changes may be made in the above articles without departing from the scope of the invention, it is intended that all matter contained in the above description or shown in the accompanying drawings shall be interpreted as illustrative and not in a limiting sense.

We claim:

1. A desiccant canister comprising first and second end portions, a body portion and at least one gas permeable, liquid impermeable disk-shaped member, wherein the first end portion is secured to the body portion, wherein the second end portion comprises an outer wall and a top wall with perforations passing through the second end portion, wherein said disk-shaped member is secured to the top wall and the outer wall of the second end portion, wherein desiccant material is placed within the desiccant canister between the disk-shaped member and the first end portion and wherein the second end portion with disk-shaped member secured thereto is secured to the body portion.

2. The desiccant canister of claim 1 wherein the first end portion is formed as an integral element of the body portion.

3. The desiccant canister of claim 1 wherein the first end portion is comprised of a gas impermeable material.

4. The desiccant canister of claim 1 wherein the first end portion is perforated and a second disk-shaped member is secured to the first end portion.

5. The desiccant canister of claim 1 wherein the body portion has an outer wall with a recessed section, wherein a portion of the outer wall of the second end portion fits in the recessed section in the outer wall of the body portion.

6. The desiccant canister of claim 5 wherein the outer wall has a rounded locking rib projecting outward to assist in the locking of the second end portion to the body portion.

7. The desiccant canister of claim 1 wherein the top surface of the second end portion contains reinforcing ribs extending across the inner surface of the second end portion.

8. The desiccant canister of claim 1 wherein the perforations are in the shape of a truncated square pyramid with smaller area ends and larger area ends, wherein the smaller area ends are located at the top surface and the larger area ends are located at the inner surface of the second end portion.

9. The desiccant canister of claim 1 wherein the desiccant material is selected from the group consisting of activated charcoal, crystalline metal aluminosilicates, activated bentonites, silica gel, molecular sieves and calcium sulfate is contained within the desiccant canister.

10. The desiccant canister of claim 1 wherein the disk-shaped member is from about 0.2 to about 0.24 mm. in thickness.

11. The desiccant canister of claim 1 wherein the disk-shaped member covers substantially all of the perforations in the second end portion.

12. The desiccant canister of claim 1 wherein the disk-shaped member is secured to the second end portion of the desiccant canister by ultrasonic welding.

* * * * *